United States Patent
Spreadbury et al.

(10) Patent No.: US 9,043,162 B2
(45) Date of Patent: May 26, 2015

(54) ACQUISITION METHOD AND APPARATUS FOR MASS SPECTROMETER DATA

(75) Inventors: Peter Gerard Spreadbury, Liverpool (GB); Stephen John Platt, Tarporley (GB)

(73) Assignee: Micromass UK Limited, Wilmslow (GB)

( * ) Notice: Subject to any disclaimer, the term of this patent is extended or adjusted under 35 U.S.C. 154(b) by 703 days.

(21) Appl. No.: 13/375,028

(22) PCT Filed: May 28, 2010

(86) PCT No.: PCT/GB2010/001069
§ 371 (c)(1),
(2), (4) Date: Feb. 1, 2012

(87) PCT Pub. No.: WO2010/136775
PCT Pub. Date: Dec. 2, 2010

(65) Prior Publication Data
US 2012/0136586 A1 May 31, 2012

Related U.S. Application Data

(60) Provisional application No. 61/182,124, filed on May 29, 2009.

(30) Foreign Application Priority Data

May 29, 2009 (GB) .................................. 0909284.2

(51) Int. Cl.
*H01J 49/00* (2006.01)
*H04L 12/861* (2013.01)

(52) U.S. Cl.
CPC .............. *H01J 49/0036* (2013.01); *H04L 49/90* (2013.01); *H04L 49/9031* (2013.01)

(58) Field of Classification Search
CPC .................................................... H01J 49/0036
USPC ............................................................ 702/23
See application file for complete search history.

(56) References Cited

U.S. PATENT DOCUMENTS 4,514,822 A 4/1985 Schneider et al.
5,367,162 A 11/1994 Holland et al.
(Continued)

FOREIGN PATENT DOCUMENTS

CA 2315459 2/2002
JP 2005166627 6/2005

OTHER PUBLICATIONS

PCT/IPEA/416, International Preliminary Report on Patentability for PCT/GB2010/001069, dated Sep. 30, 2011.
(Continued)

*Primary Examiner* — Bryan Bui
(74) *Attorney, Agent, or Firm* — Diederiks & Whitelaw, PLC (57) ABSTRACT

A method and apparatus for acquiring data from a mass spectrometer and its transmission to a computer system including a data acquisition engine, a network interface and a throughput optimization module which includes a ring buffer and a protocol stack. A compression engine may be provided between the acquisition engine and the ring buffer. The ring buffer is configured as a number of segments containing portions of memory matching the size of data words from the acquisition engine. When a segment is full of data corresponding to the words, or is partially full and has received data containing an end of scan marker, the number of words in the segment is written into a header word in the segment and the data in that segment are moved to the protocol stack. Subsequent data is received by the next segment in the buffer.

31 Claims, 4 Drawing Sheets

(56) References Cited

U.S. PATENT DOCUMENTS

| | | |
|---|---|---|
| 5,981,946 A | 11/1999 | Mason |
| 6,775,245 B1 | 8/2004 | Ishida et al. |
| 7,498,568 B2 * | 3/2009 | Overney et al. ............... 250/282 |
| 2006/0243900 A1 * | 11/2006 | Overney et al. ............... 250/284 |
| 2006/0248942 A1 | 11/2006 | Oonishi et al. |
| 2006/0249669 A1 | 11/2006 | Bern |
| 2007/0023630 A1 * | 2/2007 | Malek et al. ................. 250/282 |
| 2007/0102633 A1 | 5/2007 | Kresie et al. |
| 2008/0029697 A1 | 2/2008 | Willis et al. |
| 2009/0037671 A1 | 2/2009 | Bower et al. |

OTHER PUBLICATIONS

Operating Instuctions—PrismaPlus Compact Mass Spectrometer System, 55 pages, 2007.

Communication Protocol—PrismaPlus Compact Mass Spectrometer System, 82 pages, 2008.

* cited by examiner

Figure 1

Figure 2

ACQUISITION METHOD AND APPARATUS FOR MASS SPECTROMETER DATA

CROSS-REFERENCE TO RELATED APPLICATIONS

This application represents a National stage application of PCT/GB2010/001069 entitled "Acquisition Method and Apparatus for Mass Spectrometer Data" filed May 28, 2010 which claims priority from and the benefit of U.S. Provisional Patent Application Ser. No. 61/182,124 filed on 29 May 2009 and United Kingdom Patent Application No. 0909284.2 filed on 29 May 2009. The entire contents of these applications are incorporated herein by reference.

FIELD OF THE INVENTION

The present invention relates to the field of acquisition systems for the digitisation and processing of mass spectrometer detector signals, and particularly time of flight mass spectrometer signals.

BACKGROUND OF THE INVENTION

Time-of-flight mass spectrometers comprise an ion source, a pulsed acceleration region, a field free region and a detector. A sample is introduced into the ion source that ionises it, allowing it to be accelerated by a pulsed electric field within the acceleration region. The accelerated ions travel through the field free region at a velocity proportional to the square root of their mass-to-charge ratio. Thus, the time at which the ions arrive at the detector is dependent on their mass-to-charge ratio. Due to practical limitations restricting the length of the field free region, to obtain good mass resolution requires that the detector signal is digitised by an acquisition system sampling in the GHz range.

The output signal is split temporally into two periods; the first defined as the scan time is when the detector signal represents the mass spectrum of the sample, starting from the time when the acceleration pulse occurs. The second time period that is used to separate one scan from another is defined as the inter-scan period.

Even though the sampled signal is processed within an acquisition module to detect peaks, there is still a large amount of data that must be transferred from the acquisition module to the mass spectrometer's embedded computer system and on to its host computer system.

The embedded computer system uses the acquired data on a scan-by-scan basis which requires that the data is transferred in-between two consecutive scans, i.e. in the inter-scan period. During this period the instrument is not acquiring data so this is effectively "dead time". For this reason, the inter-scan period must be kept to a minimum and hence the data must be transferred as quickly as possible.

As new analysis techniques are developed such as Ion Mobility Spectrometry (IMS), the amount of data per scan increases, requiring ever faster transfer rates.

An object of the present invention is to improve the rate of data throughput in a mass spectrometer data, acquisition system.

SUMMARY OF THE INVENTION

Viewed from one aspect, the invention provides a method of mass spectrometer data acquisition, in which an acquisition engine receives data from an ion detector of the mass spectrometer, detects intensity peaks and, for each peak, generates a data word of a predetermined number of bits containing time and intensity information in respect of that peak, and data corresponding to the data words is communicated to a processor using a network interface; wherein between the acquisition engine and the network interface data chunks corresponding to the data words are passed through a data throughput module comprising a buffer which receives the data chunks and a protocol stack which is connected to the network interface, the buffer comprising a number of segments each defined by a block of memory configured as a plurality of portions of said predetermined number of bits, at least one header portion of each segment being reserved for a header word containing header information in respect of the contents of the segment; and wherein the data chunks are streamed into a segment, each chunk occupying one of said portions, and when that segment is full, data is streamed into the next segment, and the data in the first segment is transferred from the first segment to the protocol stack.

Viewed from another aspect, the invention provides mass spectrometer data acquisition apparatus comprising an acquisition engine arranged to receive data from an ion detector of a mass spectrometer in order to detect intensity peaks and, for each peak, to generate a data word of a predetermined number of bits containing time and intensity information in respect of that peak, and a network interface for communicating data corresponding to the data words to a processor; wherein between the acquisition engine and the network interface there is provided a data throughput module comprising a buffer for receiving data chunks corresponding to the data words and a protocol stack which is connected to the network interface, the buffer comprising a number of segments each defined by a block of memory configured as a plurality of portions of said predetermined number of bits, at least one header portion of each segment being reserved for a header word containing header information in respect of the contents of the segment; the buffer being configured so that the data chunks are streamed into a segment, each chunk occupying one of said portions, and when that segment is full, data is streamed into the next segment, and the data in the first segment is transferred from that segment to the protocol stack.

Viewed from another aspect the invention provides a mass spectrometer data acquisition system comprising an acquisition engine arranged to receive data from an ion detector of a mass spectrometer in order to detect intensity peaks and, for each peak, to generate a data word containing time and intensity information in respect of that peak, and a network interface for communicating data corresponding to the data words to a processor; wherein between the acquisition engine and the network interface there is provided a data throughput module comprising a ring buffer for receiving data chunks corresponding to the data words. Viewed from another aspect the invention provides a mass spectrometer data acquisition system comprising an acquisition engine arranged to receive data from an ion detector of a mass spectrometer in order to detect intensity peaks and, for each peak, to generate a data word containing time and intensity information in respect of that peak, and a network interface for communicating data corresponding to the data words to a processor; wherein between the acquisition engine and the network interface there is provided a data throughput module comprising a compression engine.

Viewed from another aspect the invention provides a mass spectrometer data acquisition system comprising an acquisition engine arranged to receive data from an ion detector of a mass spectrometer in order to detect intensity peaks and, for each peak, to generate a data word containing time and intensity information in respect of that peak, and a network interface for communicating data corresponding to the data words to a processor; wherein between the acquisition engine and the network interface there is provided a data throughput module comprising a protocol stack. Viewed from another aspect the invention provides a mass spectrometer data acquisition system comprising an acquisition engine arranged to receive data from an ion detector of a mass spectrometer in order to detect intensity peaks and, for each peak, to generate a data word containing time and intensity information in respect of that peak, and a network interface for communicating data corresponding to the data words to a processor; wherein between the acquisition engine and the network interface there is provided a data throughput module comprising (i) a compression module and a ring buffer; or (ii) a compression module and a protocol stack; or (iii) a compression module, a ring buffer and a protocol stack; or (iv) a ring buffer and a protocol stack.

Viewed from another aspect the invention provides a method of mass-spectrometer data acquisition, comprising: receiving, by an acquisition engine, data from an ion detector of a mass spectrometer; detecting intensity peaks in the received data; for the detected peaks, generating, by the acquisition engine, data containing time and intensity information in respect of the peaks; and communicating the data containing time and intensity information by means of a network interface to a processor; wherein the data from the acquisition engine is passed to a data throughput optimisation module which includes a buffer that buffers, formats and packetizes received data and communicates the packetized data to a protocol stack; and the protocol stack communicates the data to the network interface.

BRIEF DESCRIPTION OF THE DRAWINGS

The invention will be better understood from a consideration of the following description of preferred embodiments and with reference to the accompanying drawings, in which.

DETAILED DESCRIPTION OF THE INVENTION

In embodiments of the invention, a buffer serves to buffer, packetize and format the data from the mass spectrometer. The formatting of data by the buffer is optimised for compatibility with the protocol stack to maximise the system's data throughput. The protocol stack handles the transfer of the data to the embedded computer via a network link. In preferred embodiments, the protocol stack is a hardware stack to optimise performance.

In a typical application, the words could be, for example, 64 bits in length although depending on the data requirements the predetermined number of bits could be more or less than this. The buffer would then comprise a number of segments, each arranged as a number of 64 bit portions. For example, if there are 2048 of these portions, each capable of receiving 64 bits, each segment will occupy 16 kilobytes of memory. There could be, for example, 8 or more segments.

The chunks of data passed into the buffer may not be the original 64 bit words but may, for example, be chunks of data which represent the words if a compression engine is used between the data acquisition engine and the buffer, as discussed in more detail later.

There may be one or more words in each segment for header information, such as scan information. In preferred embodiments, the number of portions containing data in the segment, or the number of portions containing chunks corresponding to the data words from the acquisition engine, is stored in the header information. Whilst segments will normally be full, in some cases a segment will contain the last of the data from a particular scan. In that case, the last data word from the acquisition engine will contain an end of scan marker. Once this is detected, the buffer moves on to the next segment without filling the first segment. An end of scan word can be written into the first segment. A header word for the segment is provided with information identifying the total number of portions occupied in the segment. This could be the absolute total, or the total of portions corresponding to scan data words. In any event, the relationship between the buffer and the protocol stack is such that the protocol stack knows what data is to be retrieved from the buffer in respect of a given segment. The data that is transmitted subsequently over the network to the processor may have buffer artefacts, i.e. the header word or words, stripped out in the protocol stack. Alternatively, the header words could be retained.

The buffer may be a First In, First Out buffer, and the preferred type of buffer is a ring buffer. When such a buffer is full, new data will over-write the oldest data in the buffer. To prevent this happening in preferred embodiments of the invention, if the speed of data out of the buffer is not high enough to keep up with the flow of data into the buffer, the speed of data received from the acquisition engine is controlled.

In some embodiments of the invention, between the acquisition engine and a ring buffer there may be provided a data compression engine that increases the data throughput for a given network wire rate. The data compression engine should use a lossless data compression technique, such as LZRW3. The compression engine may, for example, take a 64 bit word from the acquisition engine, and generate from that a chunk of data consisting of a sequence of 8 bytes of compressed data. The data compression engine could operate multiple stage. For example, in a two stage system, prior to the LZRW3 compression there may be an initial stage in which the data is formatted into groups with an initial 64 bit word value and then difference 8 bit values for the time and intensity, until the difference is greater than can be accommodated in 8 bits. In addition, there could be a level of data compression in the ADC acquisition engine, which can strip our zero values.

The functions of the buffer and protocol stack, and of the optional compression engine, may be implemented in a Field Programmable Gate Array (FPGA).

Figure 1:
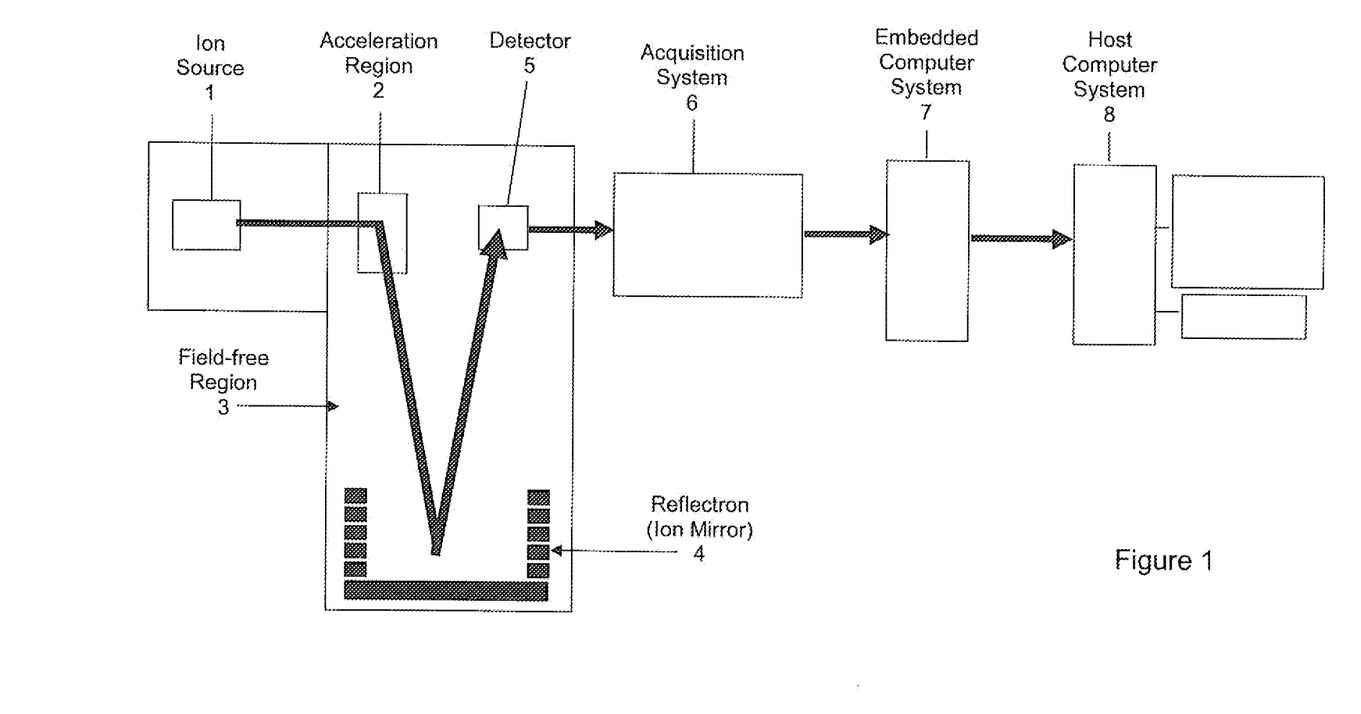
FIG. 1 shows a time of flight mass spectrometer system according to the present invention, in diagrammatic form.

Referring now in detail to the figures, FIG. 1 shows a time of flight mass spectrometer system comprising: an ion source 1, an acceleration region 2, a field-free region 3, a reflectron (ion mirror) 4, a detector 5, an acquisition system 6, an embedded computer system 7 and a host computer system 8.

Ions formed in the ion source from the sample compound enter the acceleration region where they are driven by an acceleration voltage pulse into the field-free region. The ions are accelerated to a velocity determined by the energy imparted by the acceleration pulse and their mass, lighter ions achieving a higher velocity.

A reflectron is used to increase the length of the path the ions take from the acceleration region to the detector for a given length of analyser housing. This allows greater separation in time between ions with different velocities.

Ions arrive at the detector after a time determined by their velocity and the distance traveled, thus enabling their mass to be determined.

The output of the detector is sampled by the acquisition system which then generates a value dependent on each ion arrival time forming a mass spectrum that is passed to the embedded computer system. The operation of the acquisition system is described in greater detail below.

The embedded computer system passes the mass spectrum data to the host computer system for further analysis and storage. The embedded computer system can also analyse the data for data dependent acquisitions. This allows the content of the mass spectrum data to be used to change the mass spectrometer's configuration on a scan-by-scan basis.

Figure 2:
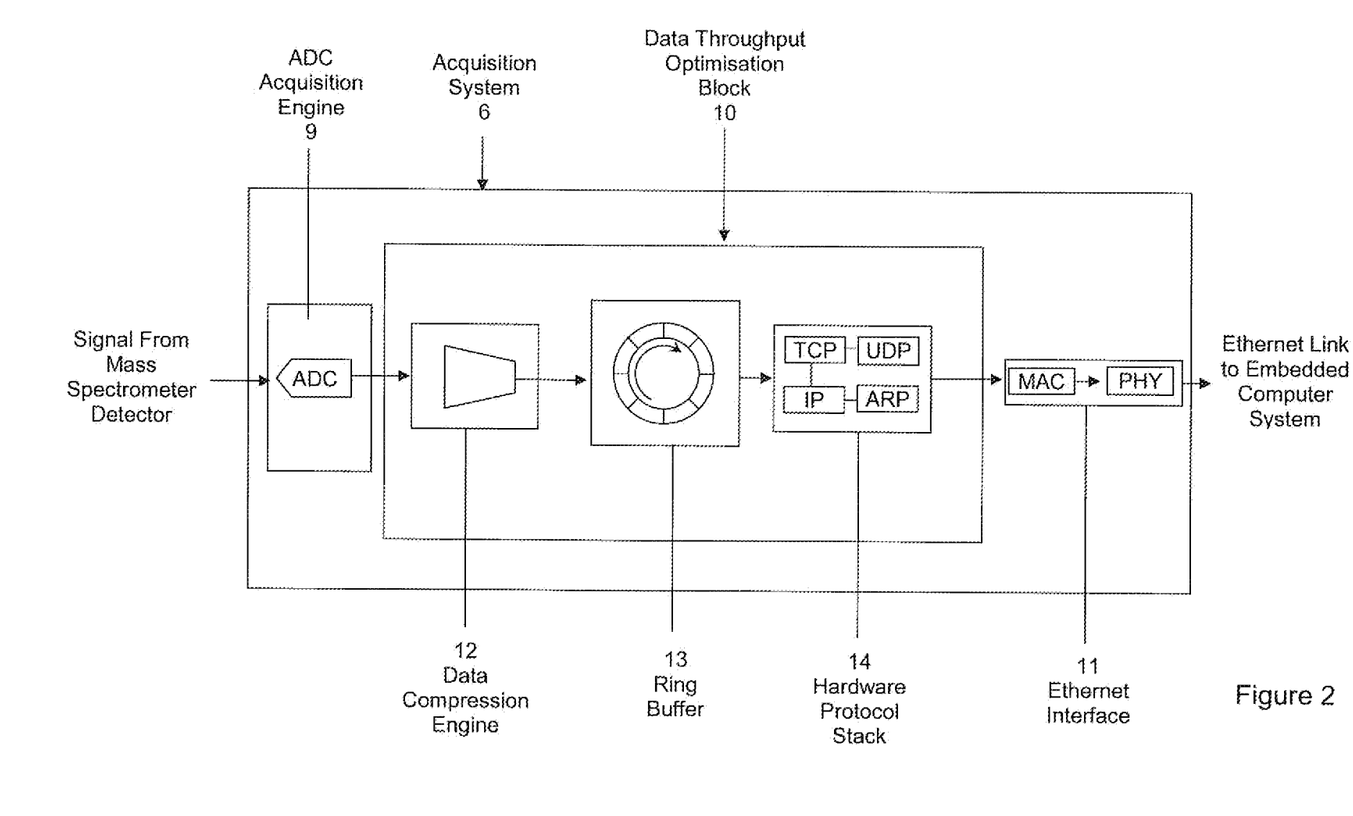
FIG. 2 shows a block diagram of a data throughput optimisation module within the acquisition system for the spectrometer of FIG. 1.

FIG. 2 shows a block diagram of the acquisition system comprising: an acquisition engine 9, a data throughput optimisation module 10 and an Ethernet interface 11 for the output of data to the embedded computer system 7. The data throughput optimisation block itself comprises a data compression engine 12, a ring buffer 13 and a hardware protocol stack 14.

The detector signal from the mass spectrometer that is input to the acquisition system is first sampled by a high speed analogue-to-digital converter (ADC) within the acquisition engine. The acquisition engine then detects any peaks present within the signal and converts them to data pairs comprising of time and intensity information. The ADC can optionally carry out an initial stage of data compression by stripping out zero values The data pairs for each peak are formatted into a 64-bit word that is input into the data throughput optimisation module. At the end of a scan a special 64-bit word is generated that contains an end-of-scan flag but does not contain any peak information.

In an optional first stage of data compression, the data is converted to groups comprising a 64 bit word and subsequent 8 bit difference words. This is appropriate in the present context, where the data tends to come in groups of values that do not differ greatly from each other. An initial 64 bit word is created for the initial value in a group and then 8 bit difference words for subsequent values. There would be one 8 bit word for the time difference and one 8 bit word for the intensity difference. When the difference is greater than can be accommodated in 8 bits, the next group needs to be started and a 64 bit word is created.

The precise nature of formatting may vary. For example the initial values may be in words that have more or less than 64 bits, and the difference words may be of more or less than 8 bits, provided they are smaller than the initial word of the group.

The next stage of the optimisation block is the data compression engine 12 that uses an LZRW3 (Lempel-Ziv Ross Williams) compression algorithm to provide lossless data compression. The LZRW3 algorithm is used as it is very efficient to build within the logic of an FPGA and gives a compression solution that can operate at very high data throughput rates in excess of 1 Gigabit per second. However, other data compression algorithms could be used. The compression engine processes each 64-bit data word from the data acquisition engine as a sequence of 8 bytes. However, the LZRW3 engine treats all incoming data as 8 bit words and is not concerned with higher level formatting, i.e. whether there are 8 bytes forming 64 bit words. The output from the compression engine will comprise chunks, each of which contains a sequence of bytes corresponding to an original word but in the event of compression there will be a smaller number of bytes in a chunk.

The output of the data compression engine is input into the ring buffer 13. The input of the ring buffer is designed to look like a First-In-First-Out (FIFO) memory that is 16384 deep of 64-bit portions. This gives an 8 segment ring buffer, each segment being a 16 kByte block of memory arranged as 2048×64-bit portions. The LZRW3 engine may work on 16 k blocks of data at a time to match the size of a segment.

Figure 3A:
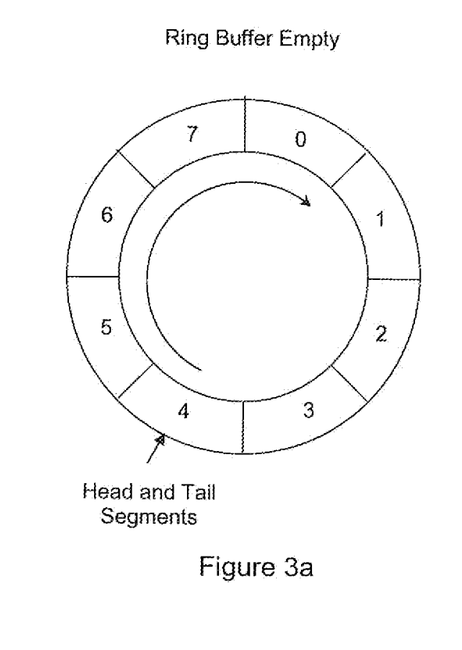
FIG. 3 illustrates the operation of a ring buffer within the data throughput optimisation module, in diagrammatic form.
Figures 3B, 3C:
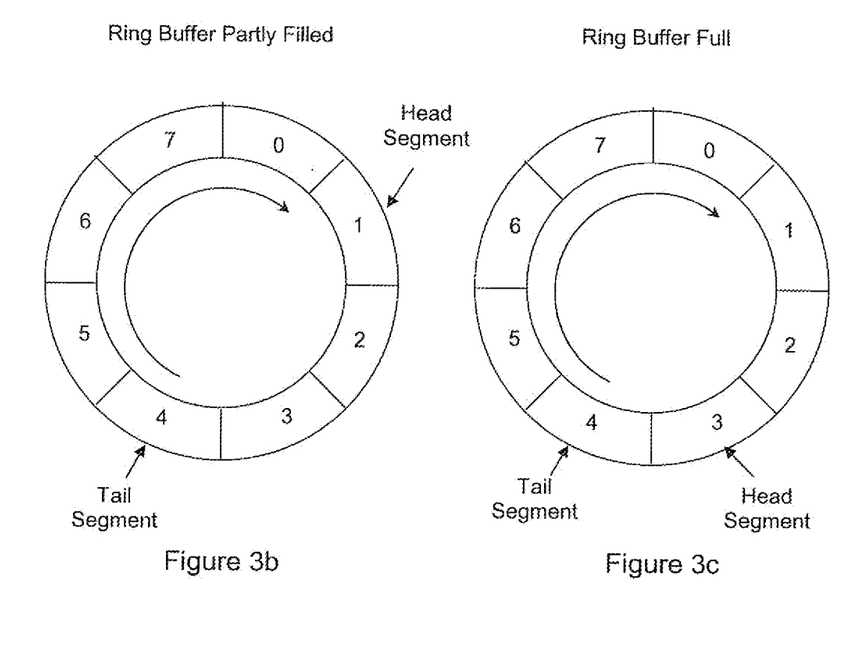

FIG. 3 illustrates the operation of the ring buffer showing the active head and tail segments when it is empty 3a, partly filled 3b and full 3c.

The first two portions of each segment are reserved for header information data. The incoming data chunks from the data compression engine are therefore streamed into the ring buffer from the third portion of each segment onwards and this continues until a segment is filled. Once the segment has filled, the ring buffer head pointer is advanced to the next segment in the ring.

To ensure that all data within a scan will be sent to the embedded computer system, the ring buffer head pointer is also advanced to the next segment when an end-of-scan flag is detected in a data word. When an end of scan marker is detected in the data stream from the data acquisition engine, this is not compressed and is written into the next 64-bit position in the ring buffer. As the number of words is recorded in the segment header, the embedded and host computer systems can differentiate between the compressed data and the end of scan marker in an end of scan segment.

Simultaneously as the ring buffer 13 is being filled, the hardware protocol stack 14 is emptying it, causing the tail to advance around the ring. If the ring buffer fills up, with the head catching up to the tail, it throttles back the data flow from the data compression engine 12 and the acquisition engine 9. Whenever the acquisition engine stops streaming data, the ring buffer will continue to empty until the tail catches up with the head.

Figure 4A:
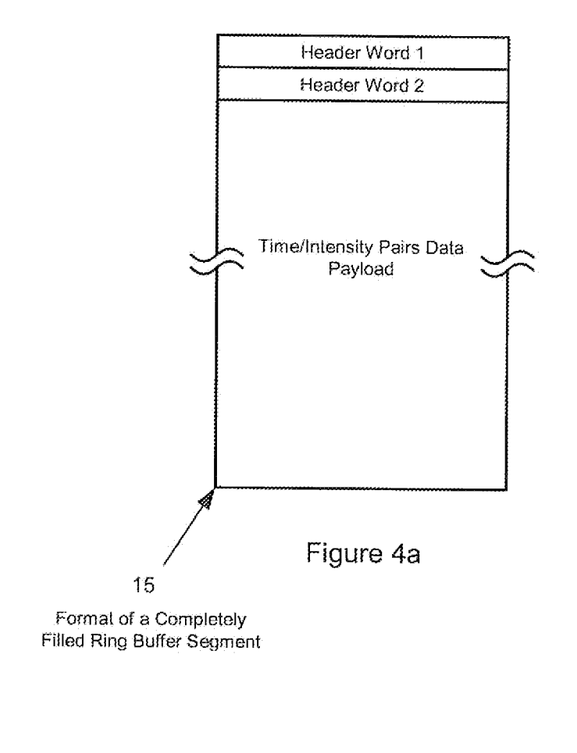
FIG. 4 shows the format of ring buffer segments output to the protocol stack.
Figure 4B:
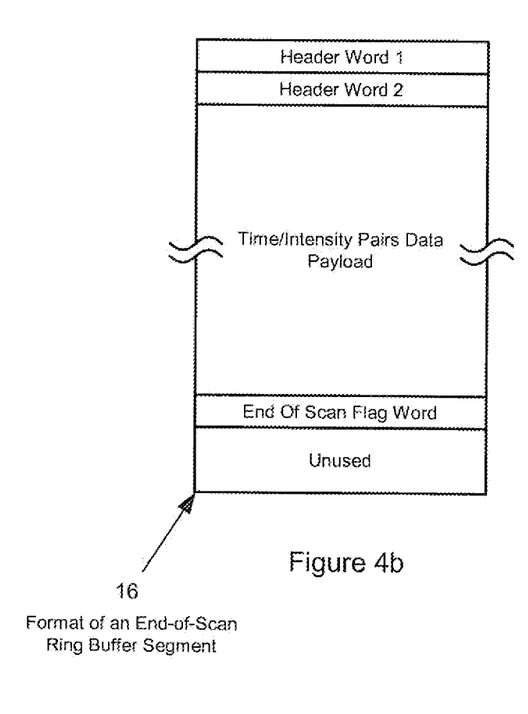

Whenever a segment within the ring buffer is filled, the ring buffer signals to the hardware protocol stack that a segment is ready to be sent over the network and also how many words there are to be sent. The ring buffer also fills in the two 64-bit header section at the beginning of the segment with the number of words/chunks in the segment and any scan related information. FIG. 4a shows the format of a completely filled ring buffer segment 15 and FIG. 4b an end-of scan ring buffer segment 16.

Once the hardware protocol stack has finished processing a segment, it signals to the ring buffer which will then advance the tail segment by one towards the head. If no more data is being written into the ring buffer, the tail will eventually catch up with the head as the ring buffer empties.

The ring buffer formats the data to allow the optimum transmission rate by the protocol stack. The maximum sized network packets possible are generated. Without this functionality, lots of small network packets could be generated and as each network packet involves various levels of protocol header overhead, this would seriously affect the performance of the network.

When the hardware protocol stack receives the content of each segment, it performs all transmit operations to send the segment data using the Transmission Control Protocol/Internet Protocol (TCP/IP) via a Media Access Control (MAC) and physical layer interface (PHY) within the Ethernet interface. The protocol stack autonomously handles receiving acknowledgements of data, handling timers and also data retransmits if necessary.

A hardware protocol stack is used as it can send data over the Ethernet interface 11 at its full wire rate of 1 Gigabit per second.

In this embodiment, decompression is carried out in the embedded computer system to give an effective data throughput from the data acquisition engine to the embedded computer of greater than the 1 Gigabit/second of the Ethernet link. Alternately, as hard disk access is one of the potential bottlenecks in the system, for maximum performance, whenever the embedded computer receives compressed data it would send it to the host computer which would then store the compressed data to its hard disk. The compressed data would then be decompressed at a later time, alleviating the need to perform "on-the-fly" decompression. This alternative approach has the disadvantage that data dependant acquisitions can not be performed.

The data compression block is optional and need not be included. It can also be modified to use different algorithms, such as more efficient algorithms yet to be developed.

The number of segments within the ring buffer can be increased if more buffering of the data within the optimisation block is required.

The bit width of the ring buffer can be increased as higher precision acquisition engines are developed.

The hardware protocol stack can be replaced with a software stack running on an embedded processor within the FPGA to give a lower performance implementation that requires less FPGA resources In this case the ring buffer still allows the data throughput to be optimised.

The protocol stack can implement different protocols, such as the User Datagram Protocol (UDP) that can give higher data throughput. As UDP does not give guaranteed delivery, probably it would only be used on a simple point-to-point network, but could include a simple form of handshaking to improve the reliability of the data transfers. Using a protocol such as Reliable User Datagram Protocol (RUDP) would provide a halfway house between UDP and TCP.

The optimisation methods can be implemented in other configurable digital electronic devices such as an Application Specific Integrated Circuit (ASIC).

In general, each of the three components of the data throughput optimisation module 10—namely the compression engine 12, ring buffer 13 and protocol stack 14—may be used individually or together in any desired combination.

It will be appreciated that embodiments of the invention provide a system and method for acquiring data from a mass spectrometer and its transmission to a computer system. The system includes a data acquisition engine, an internet interface and a throughput optimisation module which includes a ring buffer and a protocol stack. A compression engine may be provided between the acquisition engine and the ring buffer. The ring buffer is configured as a number of segments containing portions of memory each matching the size of data words from the acquisition engine. When a segment is full of data corresponding to words, or is partially full and has received data containing an end of scan marker, streaming of data into that segment is terminated, the number of words in the segment is written into a header portion in the segment and the data in that segment are moved to the protocol stack. Subsequent data is received by the next segment in the buffer.

Although the present invention has been described with reference to a particular embodiment, it will be appreciated that many modifications, variations and equivalent structures and process steps may be used without departing from the spirit and scope of the various aspects of the invention as described herein or as defined in the accompanying claims.

What is claimed is:

1. A method of mass-spectrometer data acquisition using a mass spectrometer apparatus which includes an ion source, an ion detector, and a data acquisition engine communicating with a computer system; the method comprising:
   receiving, by the acquisition engine, data from the ion detector;
   detecting intensity peaks in the received data;
   for the detected peaks, generating, by the acquisition engine, data containing time and intensity information in respect of the peaks; and
   communicating the data containing time and intensity information to the computer system;
   wherein the data from the acquisition engine is passed to a data throughput optimization module which includes a buffer that buffers, formats and packetizes received data and communicates the packetized data to a protocol stack; and the protocol stack communicates the packetized data to a network interface that communicates with the computer system; and wherein the buffer comprises a number of segments each defined by a block of memory configured as a plurality of portions of a predetermined number of bits, at least one reserved header portion of each segment being reserved for a header word containing header information in respect of the contents of the segment; data chunks containing the time and intensity information are streamed into a first one of the segments of the buffer, each chunk occupying one of the portions of the segment, and, when said first one of the segments is full, with the exception of the at least one reserved header portion, subsequent data chunks are streamed into a next segment of the buffer, header information in respect of the contents of said first one of the segments is written into the at least one reserved header portion of said first one of the segments so as to create a packet of data in said first one of the segments, and the packet of data in said first one of the segments, including the header information, is transferred to the protocol stack.

2. A method as claimed in claim 1, wherein the buffer is a First In First Out buffer.

3. A method as claimed in claim 2, wherein the buffer is a ring buffer.

4. A method as claimed in claim 1, wherein the header information identifies the number of words in the segment.

5. A method as claimed in claim 1, wherein between the acquisition engine and the buffer there is provided a compression engine.

6. A method as claimed in claim 5, wherein the compression engine provides two stages of compression, a first stage comprising formatting data into groups with an initial word of a group having a first number of bits and subsequent words in a group being difference words having a second number of bits which is less that the first number of bits.

7. A method as claimed in claim 6, wherein the difference words in a group comprise pairs of time difference words and intensity difference words.

8. A method as claimed in claim 6, wherein a second stage of compression comprises using LZRW3 type compression.

9. A method as claimed in claim 5, wherein a preliminary stage of data compression is carried out in the acquisition engine which strips out zero values.

10. A method as claimed in claim 1, wherein the protocol stack is a hardware protocol stack.

11. A method as claimed in claim 1, wherein the functions of the buffer and protocol stack are implemented in a Field Programmable Gate Array.

12. A method as claimed in claim 11, wherein between the acquisition engine and the buffer there is provided a compression engine which is also implemented in the Field Programmable Gate Array.

13. A method as claimed in claim 1, wherein the computer system is an embedded computer system which communicates with a host computer system.

14. A method as claimed in claim 1, wherein at the end of a scan, an end of scan word containing an end of scan marker is generated by the acquisition engine, and when data streamed into a segment of the buffer contains the end of scan marker, streaming of data into that segment is terminated, there is written into a reserved header portion of that segment a header word containing header information identifying the number of data chunks in that segment, thus creating a packet of data in that segment; and the packet of data in that segment is transferred to the protocol stack.

15. A method as claimed in claim 1, wherein the buffer formats the data to be optimised for compatibility with the protocol stack by generating the maximum sized network packets possible so as to allow the optimum transmission rate by the protocol stack.

16. Mass spectrometer apparatus comprising an ion source, an ion detector, a data acquisition engine and a computer system; the data acquisition engine receiving data from the ion detector, detecting intensity peaks in the received data, for the detected peaks, generating, data containing time and intensity information in respect of the peaks, and communicating the data containing time and intensity information to the computer system;
wherein between the data acquisition engine and the computer system there is provided a data throughput optimization module through which the data from the acquisition engine is passed; the data throughput module including a buffer that buffers, formats and packetizes received data and communicates the packetized data to a protocol stack; and the protocol stack communicates the packetized data to a network interface that communicates the packetized data to the computer system; and wherein the buffer comprises a number of segments each defined by a block of memory configured as a plurality of portions of a predetermined number of bits, at least one reserved header portion of each segment being reserved for a header word containing header information in respect of the contents of the segment; data chunks containing the time and intensity information are streamed into a first one of the segments of the buffer, each chunk occupying one of the portions of the segment, and, when said first one of the segments is full, with the exception of the at least one reserved header portion, subsequent data chunks are streamed into a next segment of the buffer, header information in respect of the contents of said first one of the segments is written into the at least one reserved header portion of said first one of the segments so as to create a packet of data in said first one of the segments, and the packet of data in said first one of the segments, including the header information, is transferred to the protocol stack.

17. Mass spectrometer apparatus as claimed in claim 16, wherein the buffer is a First In First Out buffer.

18. Mass spectrometer apparatus as claimed in claim 17, wherein the buffer is a ring buffer.

19. Mass spectrometer apparatus as claimed in claim 16, wherein the header information identifies the number of words in the segment.

20. Mass spectrometer apparatus as claimed in claim 16, wherein between the acquisition engine and the buffer there is provided a compression engine.

21. Mass spectrometer apparatus as claimed in claim 20, wherein the compression engine provides two stages of compression, a first stage comprising formatting data into groups with an initial word of a group having a first number of bits and subsequent words in a group being difference words having a second number of bits which is less that the first number of bits.

22. Mass spectrometer apparatus as claimed in claim 21, wherein the difference words in a group comprise pairs of time difference words and intensity difference words.

23. Mass spectrometer apparatus as claimed in claim 21, wherein a second stage of compression comprises using LZRW3 type compression.

24. Mass spectrometer apparatus as claimed in claim 20, wherein a preliminary stage of data compression is carried out in the acquisition engine which strips out zero values.

25. Mass spectrometer apparatus as claimed in claim 16, wherein the protocol stack is a hardware protocol stack.

26. Mass spectrometer apparatus as claimed in claim 16, wherein the functions of the buffer and protocol stack are implemented in a Field Programmable Gate Array.

27. Mass spectrometer apparatus as claimed in claim 26, wherein between the acquisition engine and the buffer there is provided a compression engine which is also implemented in the Field Programmable Gate Array.

28. Mass spectrometer apparatus as claimed in claim 16, wherein the computer system is an embedded computer system which communicates with a host computer system.

29. Mass spectrometer apparatus as claimed in claim 16, wherein at the end of a scan, an end of scan word containing an end of scan marker is generated by the acquisition engine, and when data streamed into a segment of the buffer contains the end of scan marker, streaming of data into that segment is terminated, there is written into a reserved header portion of that segment a header word containing header information identifying the number of data chunks in that segment, thus creating a packet of data in that segment; and the packet of data in that segment is transferred to the protocol stack.

30. Mass spectrometer apparatus as claimed in claim 16, wherein the buffer is configured to format the data to be optimised for compatibility with the protocol stack, by generating the maximum sized network packets possible so as to allow the optimum transmission rate by the protocol stack.

31. A method of mass-spectrometer data acquisition using mass spectrometer apparatus which includes an ion source, an ion detector and a data acquisition engine communicating with a computer system; the method comprising: receiving, by the acquisition engine, data from the ion detector; detecting intensity peaks in the received data; for the detected peaks, generating, by the acquisition engine, data words of a predetermined number of bits containing time and intensity information in respect of the peaks; communicating data corresponding to the data words to the computer system using a network interface; between the acquisition engine and the network interface, passing data chunks corresponding to the data words through a data throughput module comprising a ring buffer and a protocol stack that is connected to the network interface; the ring buffer comprising a number of segments, each segment being defined by a block of memory which is configured as a plurality of portions of a predetermined number of bits; wherein at least one reserved header portion of each segment is reserved for a header word containing header information in respect of the contents of the segment; the data chunks are streamed into a segment of the ring buffer, each chunk occupying one of the portions of the segment with the exception of the or each reserved header portion, and when that segment is full with the data chunks, the data chunks are streamed into a next segment of the ring buffer; in respect of the segment of the ring buffer which is full with the data chunks, writing into a said reserved header portion of that segment a header word containing header information identifying the number of data chunks in the segment, thus creating a packet of data in the segment; and transferring the packet of data in the segment to the protocol stack;

and wherein at the end of a scan, an end of scan word containing an end of scan marker is generated by the acquisition engine, and when data streamed into a segment of the ring buffer contains the end of scan marker, streaming of data into that segment is terminated, there is written into the segment a header word containing header information identifying the number of data chunks in the segment, thus creating a packet of data in the segment; and the packet of data in the segment is transferred to the protocol stack.

\* \* \* \* \*